United States Patent
Kim et al.

[11] Patent Number: 6,111,627
[45] Date of Patent: Aug. 29, 2000

[54] IN-PLANE SWITCHING MODE LIQUID CRYSTAL DISPLAY HAVING ELECTRODE FOR PREVENTING STATIC ELECTRICITY

[75] Inventors: Hyang Yul Kim; Seung Hee Lee, both of Kyoungki, Rep. of Korea

[73] Assignee: Hyundai Electronics Industries Co., Ltd., Kyoungki-do, Rep. of Korea

[21] Appl. No.: 09/198,622

[22] Filed: Nov. 24, 1998

[30] Foreign Application Priority Data

Nov. 25, 1997 [KR] Rep. of Korea ............. 97-62791

[51] Int. Cl.[7] ................................. G02F 1/1343
[52] U.S. Cl. ............................................ 349/141
[58] Field of Search .................................. 349/141

[56] References Cited

U.S. PATENT DOCUMENTS

| | | | |
|---|---|---|---|
| 5,082,352 | 1/1992 | Kawagishi et al. | 359/63 |
| 5,760,856 | 6/1998 | Yanagawa et al. | 349/42 |
| 5,905,557 | 5/1999 | Yaniv | 349/141 |
| 5,953,092 | 9/1999 | Sung et al. | 349/141 |
| 6,040,886 | 9/1999 | Ota et al. | 349/141 |

FOREIGN PATENT DOCUMENTS

| | | |
|---|---|---|
| 8-29812 | 2/1996 | Japan . |
| 8-87029 | 4/1996 | Japan . |
| 8-179380 | 7/1996 | Japan . |
| 9-269497 | 10/1997 | Japan . |
| 9-269507 | 10/1997 | Japan . |
| 9-269508 | 10/1997 | Japan . |
| 10-170958 | 6/1998 | Japan . |

*Primary Examiner*—Kenneth Parker
*Attorney, Agent, or Firm*—Ladas & Parry

[57] ABSTRACT

An IPS-LCD having an electrode for preventing a static electricity generated from an upper substrate, comprising: a lower and an upper substrates arranged oppositely and being spaced in a selected distance; a liquid crystal layer having liquid crystal molecules sandwiched between the lower and the upper substrates; a counter electrode and a pixel electrode formed on an inner surface of the lower substrate, the counter electrode being supplied with a common signal, the counter and pixel electrodes for generating the electric field for driving the liquid crystal molecules; and an electrode for preventing a static electricity formed on the portion of the upper substrate which corresponds to the counter electrode, the electrode being supplied with the common signal.

12 Claims, 5 Drawing Sheets

IN-PLANE SWITCHING MODE LIQUID CRYSTAL DISPLAY HAVING ELECTRODE FOR PREVENTING STATIC ELECTRICITY

BACKGROUND OF THE INVENTION

This invention relates to an in-plane switching mode liquid crystal display (IPS-LCD), and more particularly to an IPS-LCD having an electrode for preventing a static electricity generated from an upper substrate.

Recently, liquid crystal displays (LCDs) with light, thin, low consumption characteristics are used in OA equipments and video units and the like. There typically are a twist nematic (TN) mode and a super twist nematic (STN) mode as a LCD driving method. Although TN-LCDs and STN-LCDs have put to practical use, they have a drawback of a very narrow viewing angle. In order to solve the problem, IPS-LCDs are proposed. IPS-LCD includes a lower substrate where a pixel electrode and a counter electrode are disposed, an upper substrate having no electrode and a liquid crystals are sandwiched between the substrates.

IPS-LCD in the prior art is shown in FIGS. 1 and 2. A lower substrate 10 and an upper substrate 11, which are made of glass material, are opposed being spaced in a predetermined distance. A LC layer 15 is sandwiched between the lower and upper substrates 10 and 11 and LC molecules 17 included in the LC layer 15 whose anisotropy of dielectric constant is positive. On an inner surface of the lower substrate 10, a gate bus line which a scanning signal is applied thereto and a data bus line which a display signal is applied thereto are crossed over each other to define an unit pixel area p. At the intersection of the gate and data bus lines, a thin film transistor (TFT) 105 for switching device is disposed.

A counter electrode 3 for supplying with a common signal is disposed at the unit pixel area P of the inner surface of the low substrate 10. The counter electrode 3 has a comb shape in plane view and includes a plurality of branches 3a, 3b and 3c which are spaced in a selected distance at each other and are parallel to the data bus line 103 and a bar 3x which is connected to one-sided edges of the branches 3a, 3b and 3c and is parallel to the gate bus line 101. The pixel electrode 7 which is connected to the TFT and a display signal is applied thereto, is disposed at the unit pixel area P of the inner surface of the low substrate 10. The pixel electrode 7 has also a comb shape and the pixel electrode 7 and the counter electrode 3 are arranged with a teeth form. The pixel electrode 7 includes a plurality of branches 7a and 7b which are parallel to the data bus line 103, each branch being disposed between the branches of the counter electrode 3 and a connection part 7x which is connected to the TFT and one-sided edges of the branches 7a and 7b and is parallel in part to the gate bus line 101.

A gate insulator 5 is formed between the counter electrode 3 and the pixel electrode 7 so as to isolate them. Over the resultant surface of the lower substrate 10, a first alignment film 9 which determines the initial alignment direction of the LC molecules 17, is formed. A color filter (not shown in drawings) is disposed on an inner surface of the upper substrate 11 and a second alignment film 13 is disposed on the inner surface of the upper substrate 11 including the color filter. Herein, the first and the second alignment films 9 and 13 are homogeneous alignment film having a pretilt angle of below 10°. The first alignment film 9 is rubbed to the direction which makes the angle of about ±45° to the gate bus line and the second alignment layer 13 is rubbed to the anti-parallel direction which makes the angle of 180° against the rubbing direction of the first alignment film 9. At this time, the rubbing direction of the first alignment film 9 is varied with anisotrophy of dielectric constant of the LC molecules 17.

A polarizer 19a which firstly polarizes an incident light, is disposed on an outer surface of the lower substrate 10 and an analyzer 19b which secondarily polarizes the light passing through the LC layer 15, is disposed on an outer surface of the upper substrate 11. The polarizer 19a is attached to the lower substrate 10 so as to coincide its polarization axis with the rubbing direction of the first alignment film 9 and the analyzer 19b is attached to the upper substrate 11 to coincide its polarization axis with the polarization axis of the polarizer 19a.

The IPS-LCD as above-constructed operates as follows. When an electric field is not generated between the counter electrode 3 and the pixel electrode 7, the LC molecules 17 are arranged so as to run the long axes thereof parallel to the rubbing axes of the first and second alignment films 9 and 13 and so as to coincide the long axes of the LC molecules 17 with the polarization axis of the polarizer 19a, thereby turning to the dark state. When the voltage difference is generated between the counter electrode 3 and the pixel electrode 7, because both of the counter electrode 3 and the pixel electrode 7 are formed on the lower substrate 10, the in-plane field E which is parallel to the surface of the lower substrate 10, is generated between the counter electrode 3 and the pixel electrode 7. Accordingly, the LC molecules 17 are twisted so as to coincide the long axes thereof with the electric filed direction, thereby occurring the angle difference between the polarization axis of the polarizer 19a and the long axes of the LC molecules 17. Therefore, the light passing through the polarizer 19a passes the LC layer 15 and the analyzer 19b, thereby turning to the white state.

The prior IPS-LCD has advantages as follows. The alignment films are rubbed using a rubbing cloth to determine the rubbing direction thereof. In rubbing, the rubbing friction is caused between the surface of the alignment layer and the cloth to generate the static electricity on the surface of the alignment film. Besides, a protection film is attached on the surface of the analyzer so as to protect a screen in LCDs of the end-products. The protection film is detached from the LCDs in user's utilization of LCDs. At this time, charges are instantaneously electrified between the analyzer and the protection film. The static electricity is typically discharged by the electrodes of LCDs. However, the electrodes are not formed on the upper substrate in IPS-LCDs and the static electricity generated in the upper substrate is not discharged with ease and remains on the surface of the upper substrate. Therefore, the parasitic electric field is generated between the remaining static electricity in the upper substrate and electrodes of the lower substrate, thereby degrading the display characteristics of the LCDs.

SUMMARY OF THE INVENTION

There is an object of the present invention to discharge static electricity generated inside of IPS-LCDs.

According to an aspect of the present invention, there is provided to an in-plane switching mode liquid crystal display, comprising: a lower and an upper substrates arranged oppositely to be spaced in a selected distance; a liquid crystal layer having liquid crystal molecules sandwiched between the lower and the upper substrates; a counter electrode and a pixel electrode formed on an inner surface of the lower substrate, which generate an electric field for driving the liquid crystal molecules; and an electrode for preventing a static electricity formed on the portion of the upper substrate which corresponds to the counter electrode.

According to another aspect of the present invention, there is provided to an in-plane switching mode liquid crystal display, comprising: a lower and an upper substrates arranged oppositely to be spaced in a selected distance; a liquid crystal layer having liquid crystal molecules sandwiched between the lower and the upper substrates; a data bus line and a gate bus line disposed on an inner surface of the lower substrate, the data and the gate bus lines being crossed over each other to define a unit pixel area; a thin film transistor disposed at an intersection of the data and the gate bus lines; a counter electrode formed on the unit pixel area of the inner surface of the lower substrate; a pixel electrode formed on the inner surface of the lower substrate and connected to the thin film transistor, the pixel electrode with the counter electrode to generate the electric field for driving the LC molecules; an electrode for preventing a static electricity formed on the portion of an inner surface of the upper substrate which corresponds to the counter electrode; a first alignment layer formed on the inner surface of the lower substrate including the counter electrode and the pixel electrode; a second alignment layer formed on the inner surface of the upper substrate including the electrostatic prevention electrode; a polarizer disposed on an outer surface of the lower substrate; and an analyzer disposed on an outer surface of the upper substrate.

According to the preferred embodiment of the present invention, the electrostatic prevention electrode is comprised of a transparent conduction material or an opaque conduction material such as Cr, MoW, Mo/Al/Mo and the like. The counter electrode and the pixel electrode have tomb shapes and are arranged with a teeth form. The electrostatic prevention electrode has the same shape as the counter electrode and a common signal is simultaneously applied to the counter electrode and the electrostatic prevention electrode. The electrostatic prevention electrode has a selected width smaller than the counter electrode.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PRESENT INVENTION

Figure 1:
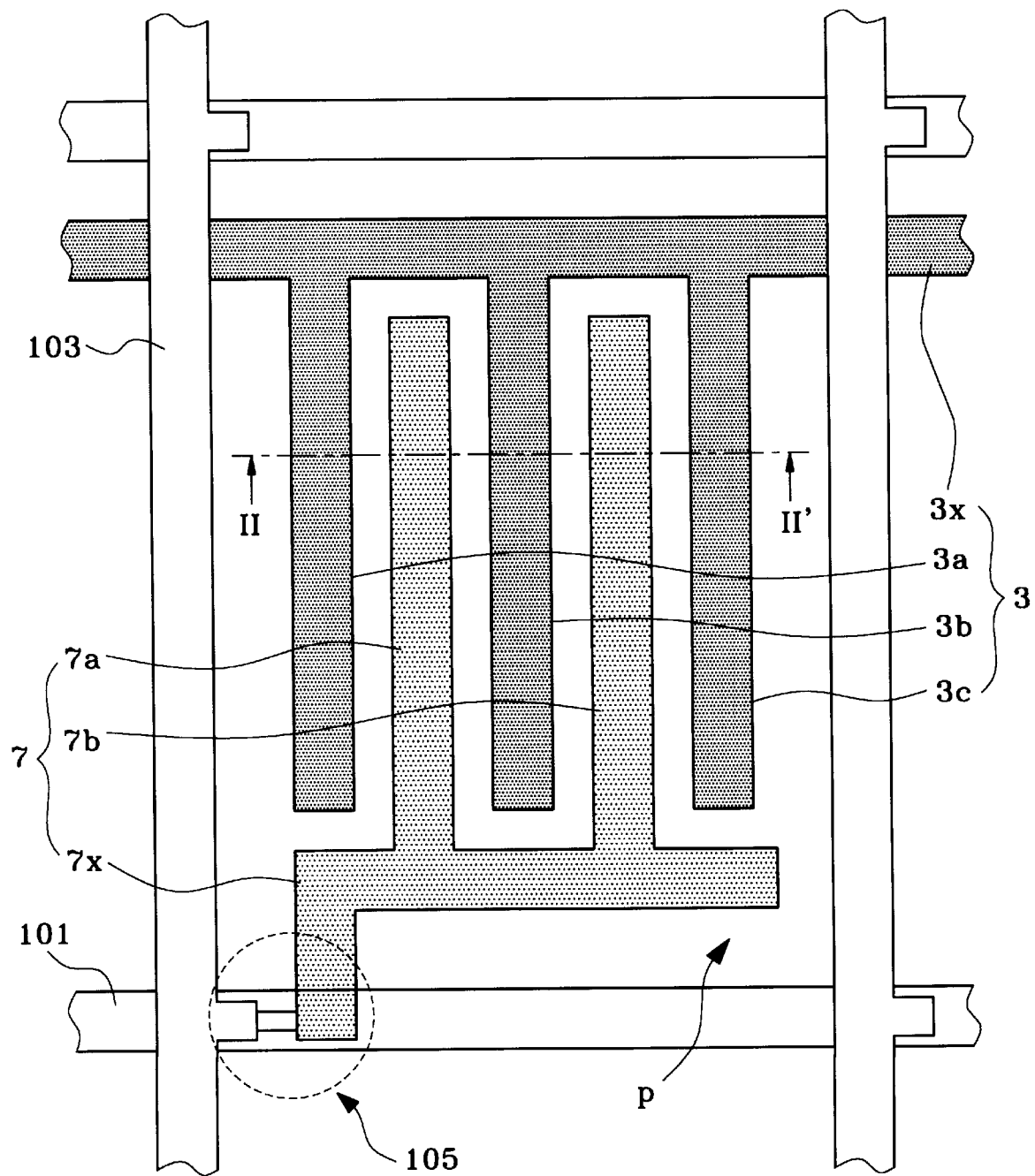
FIG. 1 is a plan view of an in-plane switching mode liquid crystal display (IPS-LCD) in the prior art.
Figure 2:
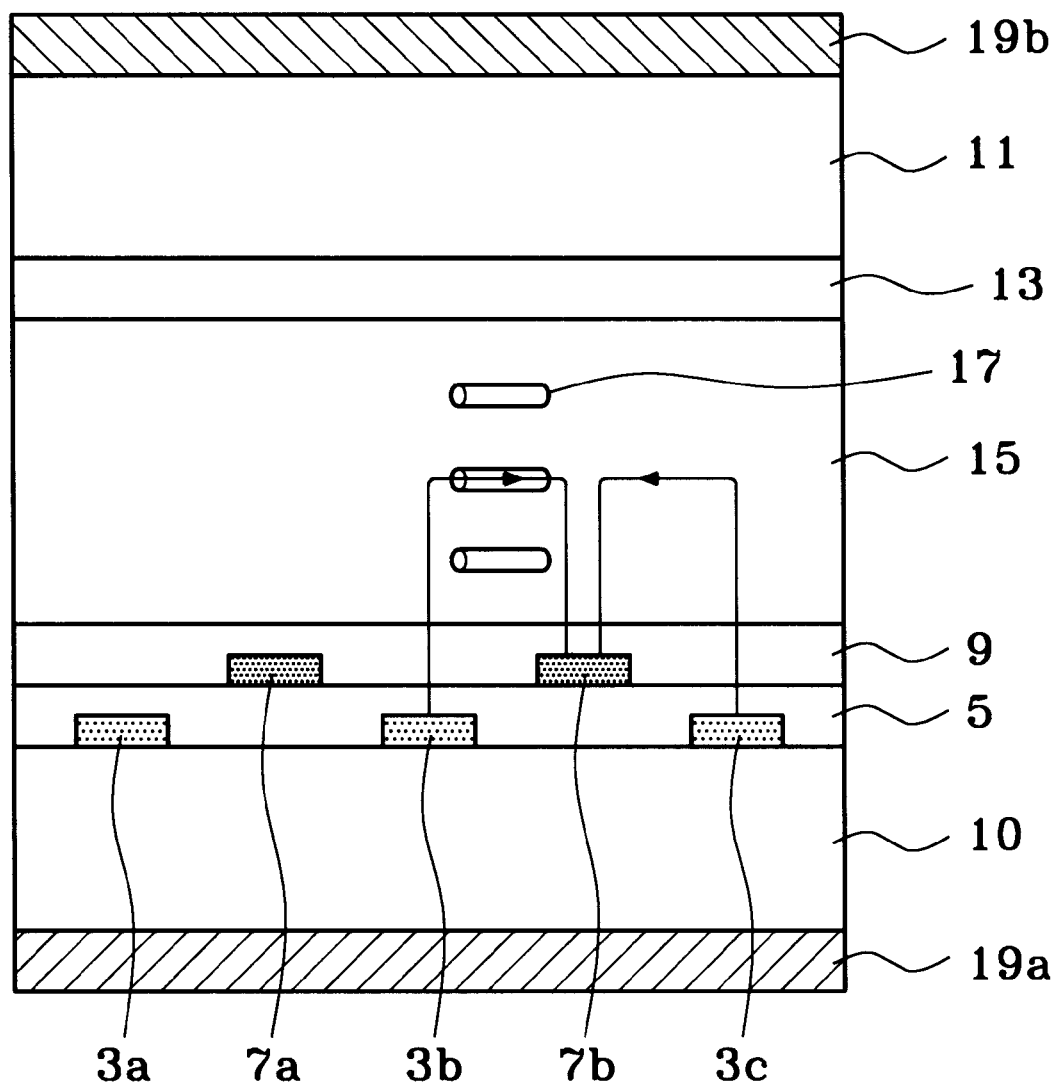
FIG. 2 is a sectional view of the IPS-LCD taken along line II-II' of FIG 1.
Figure 3:
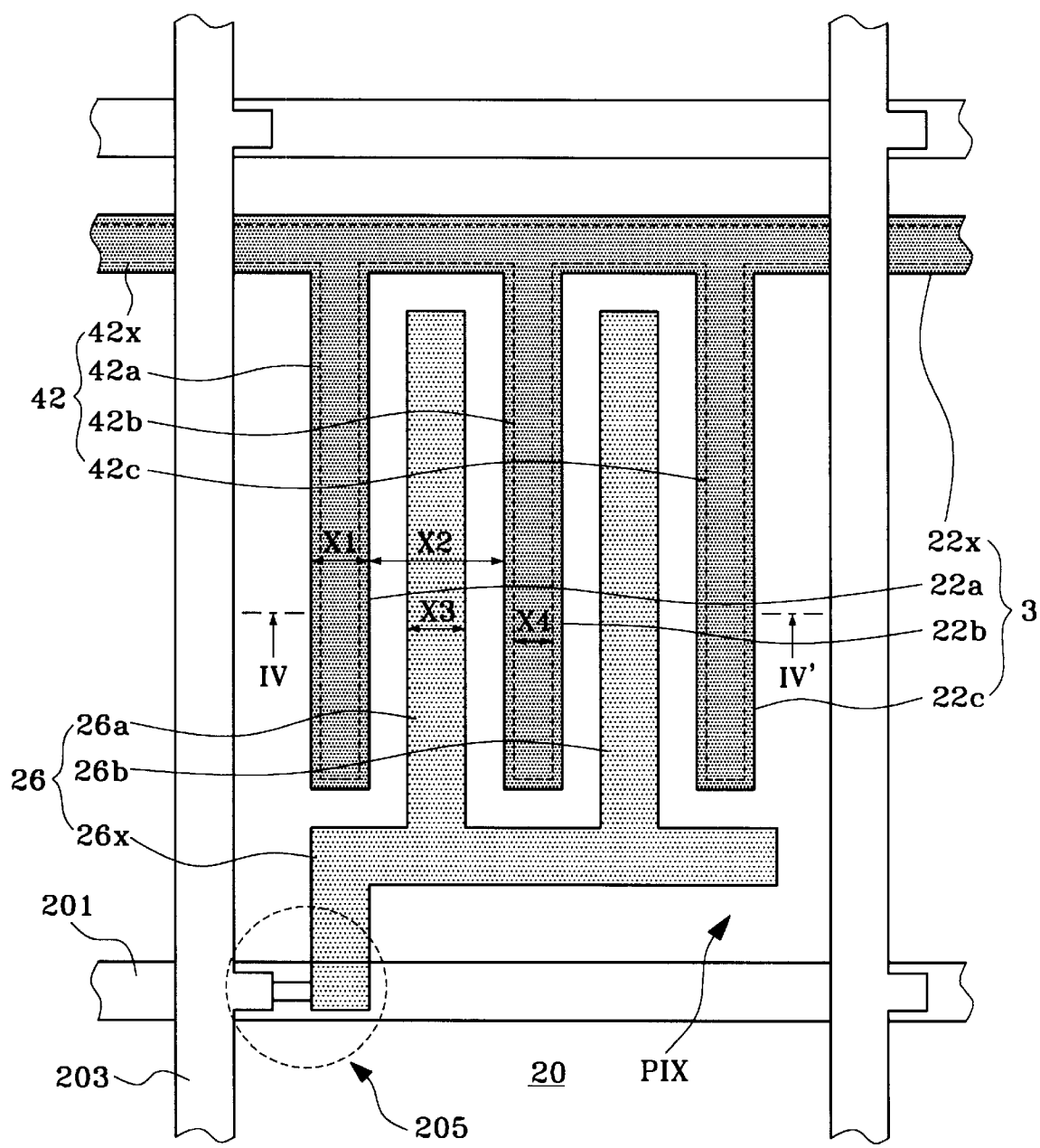
FIG. 3 is a plan view of an IPS-LCD in accordance with an embodiment of the present invention.
Figure 4:
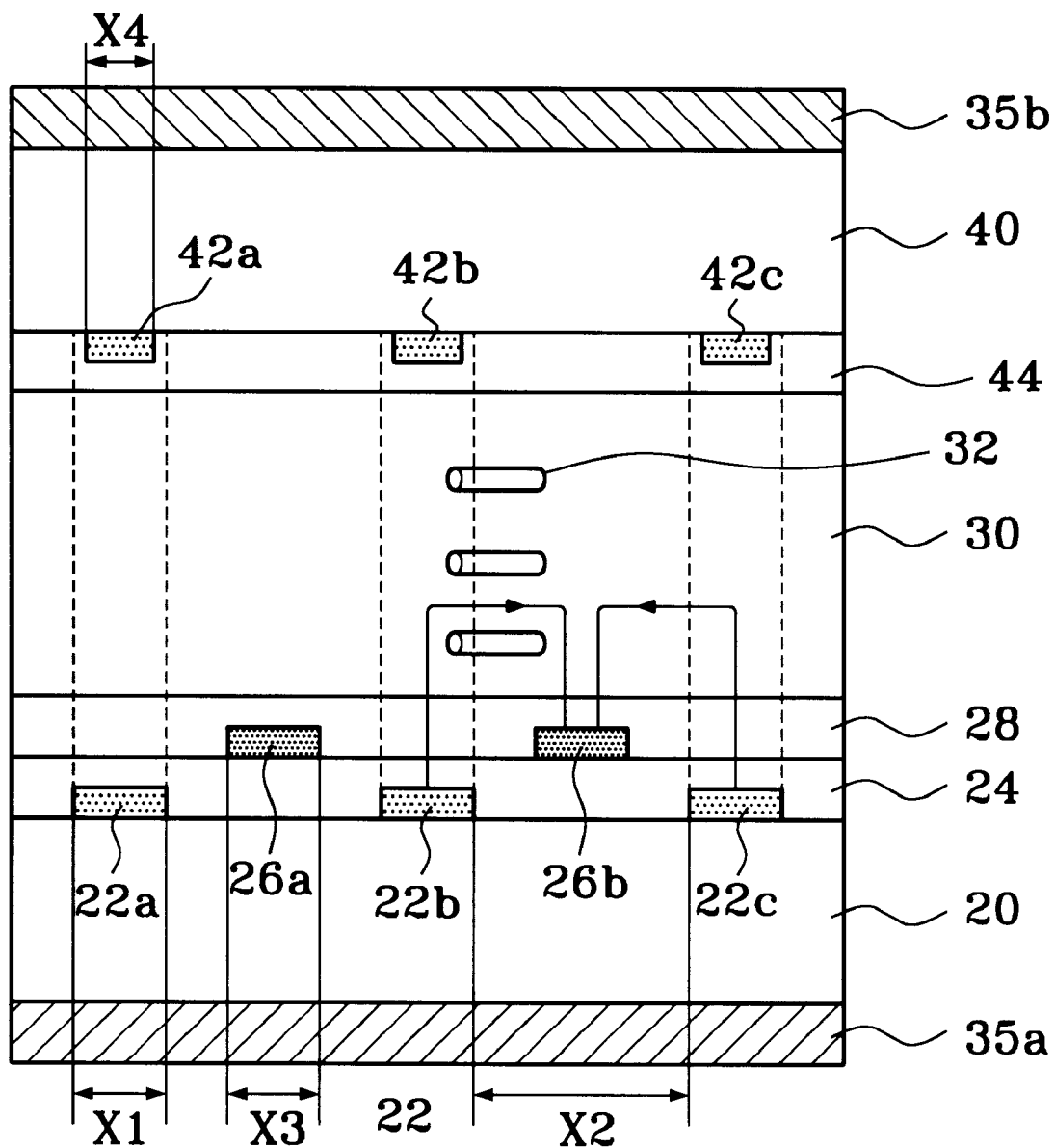
FIG. 4 is a sectional view of the IPS-LCD taken along line IV-IV' of FIG. 3.

Referring to FIGS. 3 and 4, a lower and an upper substrates 20 and 40 made of a glass material are oppositely disposed to be spaced in a selected distance and a LC layer 30 including LC molecules 32 is sandwiched between the lower and the upper substrates 20 and 40. In the preferred embodiment, the lower and upper substrates 20 and 40 are spaced in a distance of 4.0–4.5 $\mu$m. The LC molecules 32 of the LC layer 30 may be one of anisotrophy of positive dielectric constant or anisotrophy of negative dielectric constant. In the preferred embodiment, the LC molecules 32 whose anisotrophy of dielectric constant is positive, are preferably used. A gate bus line which a scan signal is applied thereto and a data bus line which a display signal is applied thereto, are formed on an inner surface of the lower substrate 20 to be crossed over each other, thereby defining a unit pixel area PIX. At an intersection of the gate bus line and data bus line, a TFT for a switching device is disposed.

A counter electrode 22 which a common signal is applied thereto, is disposed on the unit pixel area PIX of the inner surface of the lower substrate 20. The counter electrode 22 has a comb shape in plane view and including a plurality of branches 22a, 22b and 22c which are spaced in a selected distance and are parallel to the data bus line 203 and a bar 22x elongated in parallel to the gate bus line 201 and connected to one-sided edges of the branches 22a, 22b, and 22c. At this time, widths of all branches are the same and the width x1 of each branch and the space x2 between branches in the counter electrode 22 are varied with a size of the pixel. In the preferred embodiment, the width x1 of the branch is 7–9 $\mu$m and the space x2 between branches is 12–17 $\mu$m. A pixel electrode 26 for receiving a display signal is disposed in the unit pixel area PIX of the inner surface of the lower substrate 20 to be connected to the TFT (205).

The pixel electrode 26 includes a plurality of branches 26a and 26b, each of branches being disposed between branches of the counter and being parallel to a data bus line 203 and a connection part 26x being parallel in part to the gate bus line 201 and being connected to the TFT 205 and one-sided edges of the branches 26a and 26b. The pixel electrode 26 has an inverse comb shape to the counter electrode 22 so that the pixel electrode 26 and the counter electrode 22 are arranged with a teeth-form. Although a gate insulating layer 24 is formed between the counter electrode 22 and the pixel electrode 26 as shown in FIG. 4, the counter electrode and the pixel electrode may be formed in the same plane. The widths of the branches 26a and 26b in the pixel electrode 26 are the same and the width x3 of each branch and the space x4 in the pixel electrode 26 may be also varied with a size of the pixel. In the preferred embodiment, the width x3 of branch is 6–8 $\mu$m.

A color filter (not shown) is disposed in an inner surface of the upper substrate 40. An electrode 42 for electrostatic prevention which discharges the static electricity remaining in the upper substrate 40, is formed on the inner surface of the upper substrate 40 including a color filter. The electrostatic prevention electrode 42 is formed on the portion of the inner surface of the upper substrate 40 which corresponds to the counter electrode 22 of the lower substrate 20. The electrostatic prevention electrode 42 has the same comb shape as the counter electrode 22 and includes a plurality of branches 42a, 42b and 42c which are spaced in a selected distance and are parallel to the data bus line 203 and a bar 42x elongated in parallel to the gate bus line 201. The width x3 of each of branches 42a, 42b and 42c in the electrostatic prevention electrode 42 is equal to or narrower than that of each of branches 22a, 22b and 22c in the counter electrode 22 and is preferably 3–5 $\mu$m. The width of the bar 42x in the electrostatic prevention electrode 42 is narrower than that of the bar 22x in the counter electrode 22. The reason that the electrostatic prevention electrode 42 forms to have the width narrower than the counter electrode is to make the electrostatic prevention electrode 42 to correspond to the counter electrode 22, although a certain misalignment is caused in cell-bonding the lower and the upper substrates 20 and 40.

A transparent conduction material or an opaque conduction material such as Cr, MoW, or Mo/Al/Mo or the like is used for the electrostatic prevention electrode 42. The portion of electrostatic prevention electrode 42 which is disposed at the edge of the upper substrate, is dotted with Ag paste with the portion of the counter electrode 22 which is disposed at the edge of the lower substrate and a common signal is applied to the portions of the counter electrode 22 and the electrostatic prevention electrode 42 dotted with Ag paste. A first alignment layer 28 which determines an initial alignment direction of the LC molecules 32, is formed on the inner resultant surface of the lower substrate 20 and a second alignment layer 44 is formed on the inner resultant surface of the upper substrate 40. The first and the second alignment layers 28 and 44 are homogeneous alignment layers which has a pretilt angle of below 10°. At this time, the first and the second alignment layers 28 and 44 are rubbed to the predetermined direction and the rubbing directions of the alignment layers 28 and 44 are changed with anisotrophy of dielectric constant of the LC molecules 32. For example, if the LC molecules 32 within the LC layer 30 has anisotrophy of positive dielectric constant, the first alignment layer 28 is rubbed to make the rubbing axis thereof to cross a column direction (the gate bus line direction) at 45–80°. If the LC molecules 32 has anisotrophy of negative dielectric constant, the second alignment layer 44 is rubbed to make the rubbing axis thereof to cross the column direction (the gate bus line direction) at 10–45°. Accordingly, the second alignment layer 44 is rubbed to an antiparallel direction against the rubbing direction of the first alignment layer 28. That is, the rubbing direction of the second alignment layer 44 make a difference of 180° against the rubbing direction of the first alignment layer 28.

The LCD of the present invention includes a polarizer 35a for firstly polarizing the external incident light, disposed on an outer surface of the lower substrate 20 and an analyzer for secondarily polarizing the light passing through the LC layer 30, disposed on an outer surface of the upper substrate 40. The polarizer 35a is attached on the outer surface of the lower substrate 20 to coincide its polarization axis with the rubbing direction of the first alignment layer 28 and the analyzer 35b is attached on the outer surface of the upper substrate 40 to coincide its polarization axis with the polarization axis of the polarizer 35a.

Figure 5:
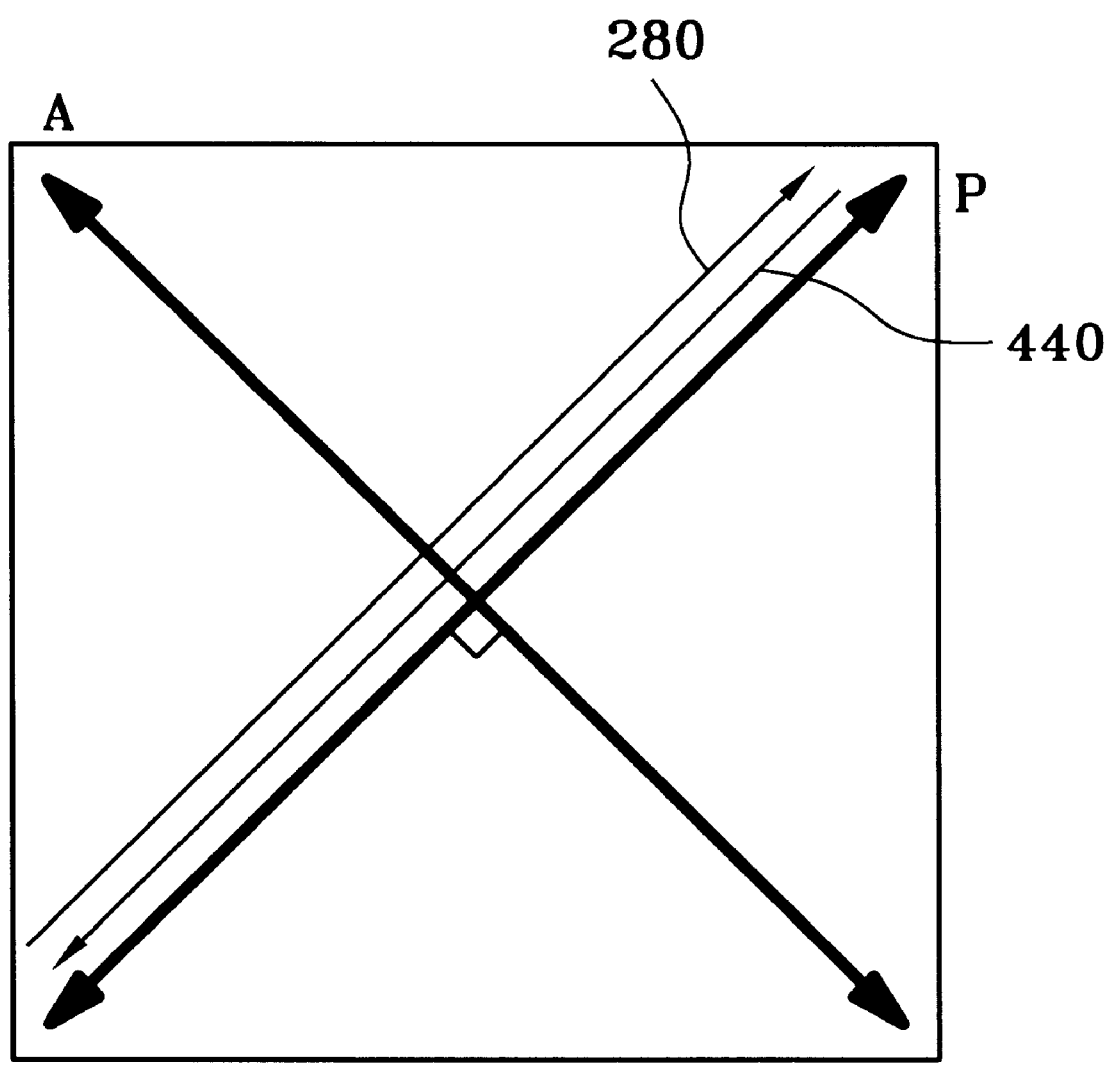
FIG. 5 is a plane view illustrating the relationship between rubbing axes of a first and second alignment films and optical axes of a polarizer and an analyzer of the present invention.

FIG. 5 shows the relation between the rubbing axes of the first and the second alignment layers 35a and 35b and the polarization axes of the polarizer 35a and the analyzer 35b. The rubbing axes 280 and 440 of the first and the second alignment layers 28 and 40 make an angle of 180°. The polarization axis p of the polarizer 35a is coincided with the rubbing axes 280 and 440 of the first and the second alignment layers 28 and 44. The polarization axis A of the analyzer 35b is perpendicular to the polarization axis of the polarizer 35a.

The IPS-LCD of the present invention operates as follows. When an electric field is not generated between the counter electrode 22 and the pixel electrode 26, the LC molecules 32 are arranged to make the long axes thereof in parallel to the rubbing axes of the first and the second alignment layers 28 and 44. Therefore, the external incident light is shielded by the polarizer 35a and the analyzer 35b and the homogeneously aligned LC molecules 32. Concretely speaking, the traveling direction of the light linearly polarized through the polarizer 35a is coincided with the long axes of the LC molecules 32 arranged according to the rubbing direction of the first alignment layer 28. The linearly polarized light is passed through the LC layer 30 without the change of the polarization state. However, the light passing through the LC layer 30 does not pass the analyzer 35a which has the polarization axis perpendicular to the polarization axis of the polarizer 35a, thereby turning to the dark state in a picture of the IPS-LCD.

On the other hand, when a display signal is provided to the pixel electrode 26 and a voltage difference is then generated between the counter electrode 22 and the pixel electrode 26, the homogenous electric field E which is parallel to the surface of the substrate 20 is produced between the counter electrode 22 and the pixel electrode 26 as shown in FIG. 4. The direction of the electric field is a direction of a normal line of the electrode, that is a row direction (the gate bus line direction). Therefore, the LC molecules are twisted to coincide the long axes (or a short axes) thereof with the direction of the electric field. The light linearly polarized through the polarizer 35a is elliptically polarized and the elliptically polarized light passes through the analyzer 35b, thereby turning to the white state in a picture of the IPS-LCD.

The electrostatic prevention electrode 42 which is formed on the upper substrate 40 is provided with a common signal which is provided to the counter electrode 22 to discharge the static electricity remaining in the upper substrate 40. Because the electrostatic prevention electrode 42 is formed on the portion of the upper substrate 40 which corresponds to the counter electrode 22 which is formed on the lower substrate 20 and the common signal applied thereto, an electric field between the counter electrode 22 and the electrostatic prevention electrode 42 is produced. On the other hand, the electrostatic prevention electrode 42 is diagonally disposed to the pixel electrode 26, thereby producing an electric field in the oblique direction therebetween. Therefore, the drawback of the prior IPS-LCD that the response time is reduced to the upper substrate 40, can be improved.

According to the present invention, the IPS-LCD forms the electrostatic prevention electrode on the portion of the upper substrate corresponding to the counter electrode, thereby discharging the static electricity remaining at the upper substrate. Besides, an electric field in the diagonal direction which is produced between the electrostatic prevention electrode and the pixel electrode, drives the LC molecules near the upper substrate, thereby improving the response time. Although the present invention forms the electrostatic prevention electrode 42 in the IPS-LCD having electrodes of a teeth-form, it is applicable to LCDs where the electrodes are formed on any one of the upper substrate and the lower substrate regardless of electrode forms.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An in-plane switching mode liquid crystal display (IPS-LCD), comprising:

a lower and an upper substrates arranged oppositely and being spaced in a selected distance;

a liquid crystal layer having liquid crystal molecules sandwiched between the lower and the upper substrates;

a counter electrode and a pixel electrode formed on an inner surface of the lower substrate, the counter electrode being supplied with a common signal, the counter and the pixel electrodes for generating the electric field for driving the liquid crystal molecules; and an electrostatic prevention electrode formed on the portion of the upper substrate which corresponds to the counter electrode, the electrode being supplied with the common signal.

2. The IPS-LCD as claimed in claim 1, wherein the electrostatic prevention electrode is comprised of a transparent conduction material.

3. The IPS-LCD as claimed in claim 1, wherein the electrostatic prevention electrode is comprised of an opaque conduction material.

4. The IPS-LCD as claimed in claim 3, wherein the opaque conduction material for the electrostatic prevention electrode is one of Cr, MoW or MoW/Al/Mo.

5. The IPS-LCD as claimed in claim 1, wherein the electrostatic prevention electrode has a smaller width than the counter electrode.

6. The IPS-LCD as claimed in claim 1, wherein the portion of the electrostatic prevention electrode which is disposed at an edge portion of the upper substrate is dotted with Ag paste with the portion of the counter electrode which is disposed at an edge portion of the lower substrate so that the common signal is simultaneously applied thereto.

7. The IPS-LCD as claimed in claim 1, wherein the portion of the electrostatic prevention electrode which is disposed at an edge portion of the upper substrate is dotted with Ag paste with the portion of the counter electrode which is disposed at an edge portion of the lower substrate so that the common signal is simultaneously applied thereto.

8. An in-plane switching mode liquid crystal display (IPS-LCD), comprising:

a lower and an upper substrates arranged oppositely and being spaced in a selected distance;

a liquid crystal layer having liquid crystal molecules sandwiched between the lower and the upper substrates;

a data and a gate bus lines disposed on an inner surface of the lower substrate, the data and gate bus lines being crossed over each other to define a unit pixel area;

a thin film transistor disposed at an intersection of the data and the gate bus lines;

a counter electrode and a pixel electrode formed on the unit pixel area of the inner surface of the lower substrate, the counter electrode and the pixel electrode for generating an electric field to drive the liquid crystal molecules, the pixel electrode being connected to the thin film transistor;

an electrostatic prevention electrode formed on the portion of the upper substrate which corresponds to the counter electrode;

a polarizer disposed on an outer surface of the lower substrate; and an analyzer disposed on an outer surface of the upper substrate.

9. The IPS-LCD as claimed in claim 8, wherein the electrostatic prevention electrode is comprised of a transparent conduction material.

10. The IPS-LCD as claimed in claim 8, wherein the electrostatic prevention electrode is comprised of an opaque conduction material.

11. The IPS-LCD as claimed in claim 10, wherein the opaque conduction material for the electrostatic prevention electrode is one of Cr, MoW or MoW/Al/Mo.

12. The IPS-LCD as claimed in claim 8, wherein the electrostatic prevention electrode has a smaller width than the counter electrode.

* * * * *